United States Patent
Dobberfuhl et al.

(10) Patent No.: US 12,458,998 B2
(45) Date of Patent: Nov. 4, 2025

(54) DAUBER ASSEMBLIES

(71) Applicant: The Boeing Company, Arlington, VA (US)

(72) Inventors: James P. Dobberfuhl, Clinton, WA (US); Jordon T. Ho, Lynnwood, WA (US); Allan Tien, Seattle, WA (US); Nathan H. Jones, Bothell, WA (US); Jason A. Fraser, Snohomish, WA (US); Scott F. Hart, Everett, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/326,882

(22) Filed: May 31, 2023

(65) Prior Publication Data

US 2024/0399408 A1    Dec. 5, 2024

(51) Int. Cl.
| | |
|---|---|
| *B05C 7/06* | (2006.01) |
| *B05B 9/03* | (2006.01) |
| *B05B 15/65* | (2018.01) |
| *B05B 15/658* | (2018.01) |
| *B05D 1/26* | (2006.01) |

(52) U.S. Cl.
CPC .................. *B05C 7/06* (2013.01); *B05B 9/03* (2013.01); *B05B 15/65* (2018.02); *B05B 15/658* (2018.02); *B05D 1/26* (2013.01)

(58) Field of Classification Search
CPC ........................................................ B05B 9/03
See application file for complete search history.

(56) References Cited

U.S. PATENT DOCUMENTS

| | | | |
|---|---|---|---|
| 3,825,021 A | 7/1974 | Seidler | |
| 5,647,111 A | 7/1997 | Zienkiewicz et al. | |
| 5,727,300 A | 3/1998 | Ekdahl et al. | |
| 5,743,359 A | 4/1998 | Parnell | |
| 9,061,313 B1 | 6/2015 | Williams et al. | |
| 9,180,480 B1 | 11/2015 | Williams et al. | |
| 11,130,146 B2 | 9/2021 | Hopkins et al. | |
| 2004/0140376 A1* | 7/2004 | Alexander | F16L 35/005 |
| | | | 239/152 |

(Continued)

FOREIGN PATENT DOCUMENTS

| | | |
|---|---|---|
| CN | 104941871 A | 9/2015 |
| CN | 105583115 A | 5/2016 |

(Continued)

OTHER PUBLICATIONS

European Patent Office, Extended European Search Report in Application No. EP24179441, Oct. 10, 2024.

(Continued)

*Primary Examiner* — Dah-Wei D. Yuan
*Assistant Examiner* — Stephen A Kitt
(74) *Attorney, Agent, or Firm* — Kolitch Romano Dascenzo Gates LLC

(57) ABSTRACT

A dauber assembly may comprise a manifold body comprising a first end configured to receive a nozzle, and a collar extending at least partially around the manifold body. The collar may comprise an inlet port. The manifold body may have one or more holes providing fluid communication between the inlet port of the collar and an outlet of a nozzle received by the first end of the manifold body.

19 Claims, 10 Drawing Sheets

(56) References Cited

U.S. PATENT DOCUMENTS

| | | | |
|---|---|---|---|
| 2005/0013193 A1* | 1/2005 | Murphy | B05B 7/1404 |
| | | | 366/163.2 |
| 2008/0121293 A1* | 5/2008 | Leber | F16K 11/076 |
| | | | 137/597 |
| 2013/0020353 A1* | 1/2013 | Schiller | B01F 35/21112 |
| | | | 222/145.5 |
| 2017/0036233 A1 | 2/2017 | Maslennikov | |
| 2017/0105513 A1 | 4/2017 | Davancens | |
| 2017/0105514 A1 | 4/2017 | Tomuta et al. | |
| 2017/0292506 A1* | 10/2017 | Shultz | F04B 17/06 |
| 2018/0050364 A1 | 2/2018 | Larrabee et al. | |
| 2018/0209468 A1 | 7/2018 | Freis et al. | |
| 2020/0055075 A1 | 2/2020 | Quddus et al. | |
| 2021/0370338 A1 | 12/2021 | Hopkins et al. | |

FOREIGN PATENT DOCUMENTS

| | | |
|---|---|---|
| DE | 4320282 A1 | 12/1994 |
| JP | 2006102725 A | 4/2006 |

OTHER PUBLICATIONS

English machine-translation of CN104941871A, downloaded from Espacenet Oct. 11, 2022.

English machine-translation of CN105583115A, downloaded from Espacenet Oct. 11, 2022.

English machine-translation of JP2006102725A, downloaded from Espacenet Oct. 11, 2022.

\* cited by examiner

DAUBER ASSEMBLIES

FIELD

This disclosure relates to systems and methods for daubers, including sealant daubers configured for use in fastener installation machines.

INTRODUCTION

Fasteners are used in various manufacturing industries, including in the manufacture of aerospace vehicles, land vehicles, machinery, and more. In some applications, a hole in which a fastener is to be installed is sealed (e.g., against ingress of moisture, debris, and/or other contaminants or corrosion) by applying a sealant to the fastener and/or to a countersink of the hole. This may be referred to as a "wet installation" of the fastener. However, it can be undesirable to apply sealant to a threaded portion of the fastener, because sealant on the threaded portion can affect the torque that should be applied to install the fastener. This may be particularly problematic if the fastener is to be installed by an automated system programmed to install the fastener by applying a predetermined torque (i.e., a torque previously selected under the assumption that the threaded portion would be free of sealant).

However, some known systems for installing fasteners and sealant are designed to install particular fasteners and may not readily accommodate fasteners having shorter grip lengths than those particular fasteners. For example, the fastening machines formerly manufactured by Gemcor Automation LLC, typically referred to as Gemcor machines, are used to fasten wing skin panels to wing stringers to manufacture aircraft wings. A Gemcor machine holds a fastener to be installed by gripping an unthreaded portion of the fastener between two gripper fingers. If the unthreaded portion of the fastener is long enough, the gripper fingers can hold a first length of the unthreaded portion while a second length of the unthreaded portion remains exposed. Sealant can be applied directly to this exposed second length of the unthreaded portion of the fastener (e.g., by one or more sealant injector nozzles that the system automatically moves into position adjacent the exposed second length of the unthreaded portion). However, if the unthreaded portion of the fastener is too short, then the gripper fingers occupy an entire length, or nearly an entire length, of the unthreaded portion. Too little length of the unthreaded portion remains exposed to allow for sealant application (e.g., because no unthreaded length remains exposed at all, or because the exposed portion is so small that not enough sealant can be deposited on it or there is not enough room to maneuver the injector nozzles to deposit the sealant). Thus for shorter fasteners, it is undesirable to apply sealant using the normal sealant injector nozzle process, because the nozzles could only apply sealant to the threaded portion of the fastener. Accordingly, a more cumbersome workaround is typically used to apply sealant in a desirable manner. For example, human operators may manually use sealant guns to apply sealant to the hole in which the fastener is to be installed. The manual process lacks certain advantages of the automated process, such as speed, reliability, and safety.

Solutions are therefore needed for automatically applying sealant for installation of fasteners having a greater range of grip lengths.

SUMMARY

The present disclosure provides systems, apparatuses, and methods relating to sealant application (e.g., for fastener installation).

In some embodiments, a dauber assembly comprises a manifold body comprising a first end configured to receive a nozzle; and a collar extending at least partially around the manifold body, the collar comprising an inlet port; wherein the manifold body has one or more holes providing fluid communication between the inlet port of the collar and an outlet of the nozzle when the nozzle is received by the first end of the manifold body.

In some embodiments, an adapter for a dauber nozzle comprises a body comprising a wall defining a hollow interior, the body having an outlet configured to receive an inlet portion of the dauber nozzle; a protrusion extending from the body and configured to be received in a holder; and a collar extending around at least a portion of a circumference of the body, the collar including an inlet stem; wherein the wall of the body has a plurality of openings and the inlet stem of the collar is in fluid communication with the outlet of the body via the plurality of openings and the hollow interior of the body.

In some embodiments, a method for applying sealant comprises receiving a sealant at a hollow interior of a manifold body via a tubular stem, wherein the tubular stem extends from a collar disposed around the manifold body and configured to rotate around the manifold body, and the tubular stem has an inlet coupled to a sealant source; and dispensing the sealant from a dauber nozzle received in the hollow interior of the manifold body.

Features, functions, and advantages may be achieved independently in various embodiments of the present disclosure, or may be combined in yet other embodiments, further details of which can be seen with reference to the following description and drawings.

DETAILED DESCRIPTION

Figure 1:
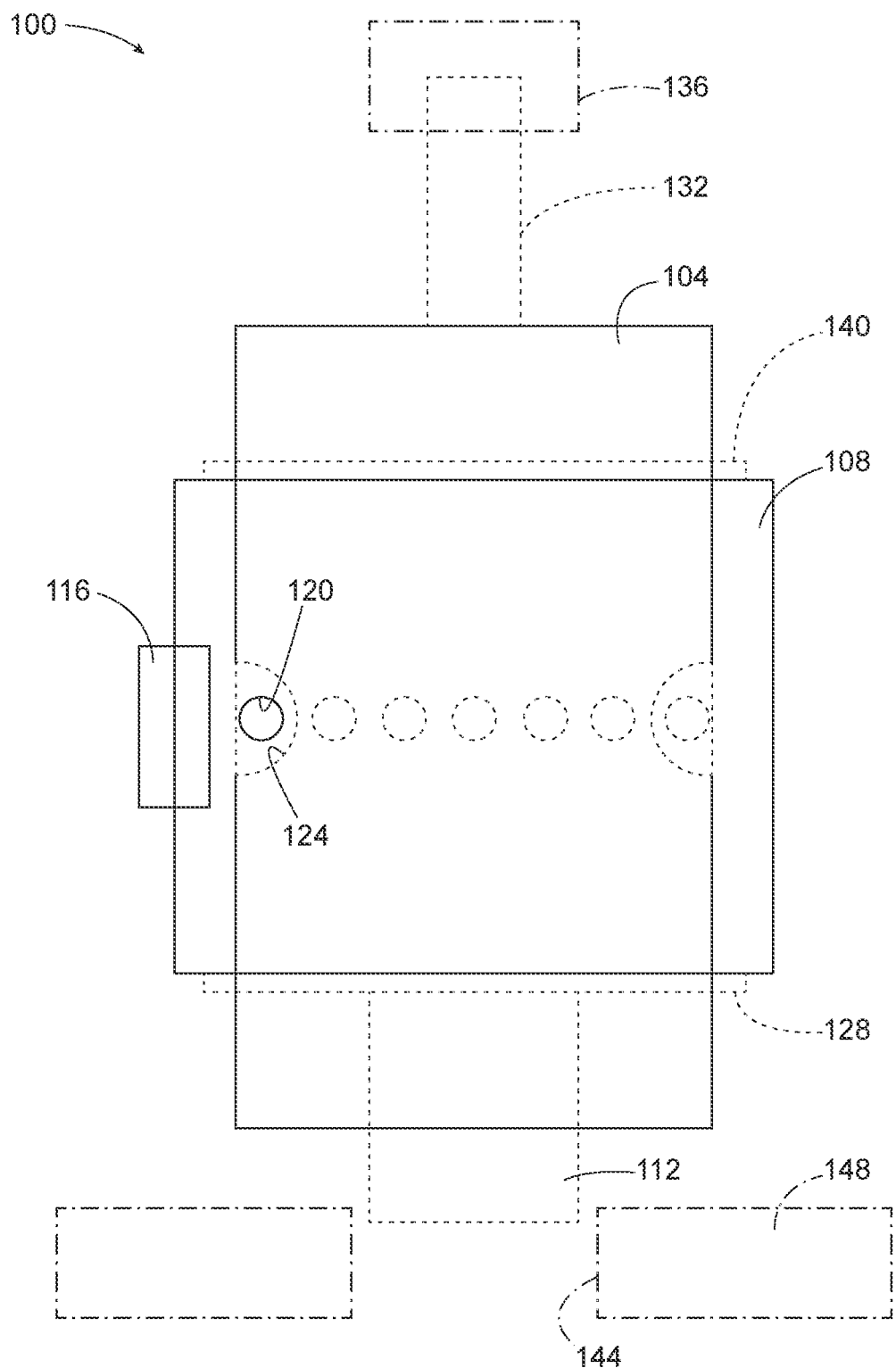
FIG. 1 is a schematic front view of an illustrative dauber assembly in accordance with aspects of the present disclosure.

Various aspects and examples of dauber assemblies, as well as related methods, are described below and illustrated in the associated drawings. Unless otherwise specified, a dauber assembly in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Unless otherwise indicated, the terms "comprising," "including," and "having" (and conjugations thereof) are used interchangeably herein to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

In general, a dauber assembly in accordance with aspects of the present teachings comprises a manifold body configured to receive a nozzle for dispensing sealant and a collar that extends at least partially around the manifold body and has an inlet port for receiving the sealant. The manifold body has a plurality of holes configured to provide fluid communication between the inlet port of the collar and the nozzle when the nozzle is received in the manifold body.

In some examples, the manifold body is configured to receive a nozzle designed for use with a known device, such as a manual sealant dauber gun. However, in general, the manifold body may be configured to receive any suitable nozzle.

In some examples, the manifold body (or other suitable portion of the dauber assembly) is configured to be mounted in a holder (e.g., a tool holder) of an at least partially automated machine, such that the dauber assembly is configured to apply sealant in an at least partially automated manner. In this fashion, the dauber assembly is configured for use in an at least partially automated fastener installation process. For example, when mounted in a holder, the dauber assembly can be used to dispense sealant in an at least partially automatic manner to a hole in which a threaded fastener is to be installed. This avoids the above-described problems that affect known systems for automatically applying sealant, which are unsuitable if the unthreaded portion of the fastener is too short and thus require the sealant to be applied manually instead.

As an example, the manifold body may include a protrusion configured to be received in a holder of a microshaver or cutter of a Gemcor machine. The microshaver and cutter of a Gemcor machine are typically used for rivet installation and sit idle when the machine is installing threaded fasteners. Accordingly, in examples in which the dauber assembly is configured to be mounted in a holder of the microshaver or cutter, the dauber assembly takes advantage of a system component that would otherwise sit idle to streamline the fastener installation process.

Known fastening processes involving a Gemcor machine generally include drilling a hole, loading a fastener into the Gemcor machine's gripper fingers, applying sealant to the unthreaded portion of the bolt using sealant injectors, and installing the bolt in the hole. Using the dauber assembly of the present disclosure, the fastening process may instead include drilling the hole, loading the fastener into the Gemcor machine's gripper fingers, applying sealant to the drilled hole using the dauber assembly (e.g., attached to the rivet microshaver/cutter or other suitable machine), and installing the bolt in the hole.

Fastening processes involving a Gemcor machine are a nonlimiting example of uses cases of the dauber assembly disclosed herein. As another example, the manifold body protrusion (or other suitable portion of the assembly) may be configured to be received in a holder of an end effector of a robotic arm (e.g., a robotic arm of a manufacturing system, repair system, and/or any other suitable system).

In general, components of the dauber assembly may be made of any suitable material(s) and may be manufactured by any suitable method(s). In some examples, the manifold body and collar are made of metal (e.g., aluminum, steel, and/or any other suitable metal(s)). Alternatively, or additionally, the manifold body and/or collar may be made of plastic. In some examples, the manifold body and/or collar are additively manufactured. Metal components may be reusable but may require soaking in a chemical bath to clean, and plastic components may either be cleaned or be disposed of instead of cleaning, which may be economical for a component made of plastic.

As a particular example, the manifold body may be made of steel and/or aluminum, the collar may be made of steel, aluminum, and/or plastic, and the assembly may hold a dauber nozzle that is made of plastic. Plastic nozzles are already known and available (e.g., as nozzles configured to be mounted in dauber guns), and a plastic nozzle is unlikely to scratch the surface of a workpiece, whereas a nozzle made of a harder material such as metal may mar the workpiece.

FIG. 1 schematically depicts an illustrative dauber assembly 100 in accordance with aspects of the present teachings. Dauber assembly 100 comprises a manifold body 104. Manifold body 104 comprises at least one wall defining an interior of the manifold body, and at least a portion of the interior is hollow.

A first end of manifold body 104 is configured to receive a nozzle 112, which is configured to dispense a sealant. The first end of manifold body 104 may be configured to receive nozzle 112 in any suitable manner. In some examples, the first end of the manifold body is an outlet of a hollow interior of the manifold body, and the outlet of the hollow interior of the manifold body is configured to receive an inlet portion of nozzle 112. In some examples, the first end of manifold body 104 is threaded such that the first end is configured to threadedly receive a threaded portion of nozzle 112. For example, manifold body 104 may comprise a hollow cylinder (or generally cylindrical shape), with an interior of the cylinder being threaded at the first end of the body.

As another example, the manifold body may be configured to receive the nozzle utilizing a quarter turn arrangement; for example, the manifold body may comprise one or more nubs and/or pins configured to slide into a track and/or groove of the nozzle such that the nozzle can rotate by a quarter turn to nest in a grooved stop of the body. This arrangement may facilitate fast installation and/or removal of the nozzle in the dauber assembly (e.g., such that the currently installed nozzle may be quickly replaced with a new nozzle).

As another example, the manifold body may comprise a lip (e.g., disposed in the interior of the body) configured to engage a catch portion of the nozzle (e.g., of the nozzle shaft). In such an example, the manifold body is configured to allow the shaft of the nozzle to slide into position within the body (e.g., to slide past the lip and then catch on the lip). The nozzle may be at least partially deformable, such that the nozzle can be uninstalled from the manifold body by squeezing the sides of the nozzle to disengage the lip from the catch to allow removal of the nozzle from the body.

In some examples, the first end of manifold body 104 is a lower end (e.g., a bottom end) of the manifold body. Put another way, during normal use, manifold body 104 may be oriented such that the first end of the body (i.e., the end configured to receive the nozzle) is generally downward, and an opposing second end is generally upward. This may allow the sealant to be assisted by gravity as it flows through the manifold body and out of the nozzle. However, manifold body 104 may be configured to be used in any suitable orientation. The first end of the manifold body may be described herein as a lower or bottom end for convenience and by way of illustration, and is not intended to limit the possible orientations in which the dauber assembly may be used.

Dauber assembly 100 further comprises a collar 108 extending at least partially around manifold body 104. Collar 108 comprises an inlet port 116 configured to receive a sealant and/or other suitable substance. Inlet port 116 may comprise any suitable structure(s) for receiving the sealant. For example, inlet port 116 may comprise an orifice formed in a wall of the collar and/or a hollow structure (such as a tube or a stem) extending from a wall of the collar. In some examples, inlet port 116 comprises a barbed nipple (also referred to as a barbed spud), which may be configured to couple to a flexible tube. In some examples, inlet port 116 comprises a barbed nipple having a same or similar shape and/or dimensions as the inlet nipples on conventional sealant injectors, making it convenient to use dauber assembly 100 in a system that also uses (or previously used) conventional sealant injectors.

In some examples, collar 108 is disposed rotatably about manifold body 104, such that the collar is configured to rotate about the manifold body to at least some extent. In some examples, collar 108 is configured to rotate at least 360 degrees about manifold body 104 (e.g., the collar may be configured to rotate freely about the manifold body). This allows manifold body 104 to be rotated while collar 108 stays stationary (or is translated without rotating), or vice versa. In some example use cases, it is beneficial to rotate the nozzle (e.g., by rotating the manifold body in which the nozzle is received) after (or while) dispensing sealant in a hole, so that the rotation of the nozzle helps to spread the sealant across a surface of the hole. However, it can be disadvantageous if rotating the nozzle also causes the inlet port to rotate, which could cause the inlet port to disconnect from the sealant source, allow a sealant feed tube to catch on other system components, and/or otherwise cause problems. Dauber assembly 100 avoids these disadvantages because manifold body 104 (and a nozzle held by the manifold body) can rotate relative to inlet port 116 of collar 108.

Another advantage of allowing rotation of manifold body 104 relative to collar 108 is that it facilitates mounting the manifold body in a device that allows the manifold body to rotate, rather than holding the manifold body perfectly rigidly. For example, many tool holders are designed to hold a tool in a manner that permits the tool to rotate at least a fraction of a turn. Examples include the microshaver and cutter tools of a Gemcor machine. As described above, problems could result if rotation of the manifold body resulted in rotation of the collar and inlet port as well. Again, the rotatability of manifold body 104 relative to collar 108 solves this problem.

Manifold body 104 has one or more holes 120 providing fluid communication between inlet port 116 and the outlet of a nozzle being held in the manifold body. Manifold body 104 may be configured to provide fluid communication between inlet port 116 and the nozzle via a hollow interior of the manifold body. Accordingly, sealant received at inlet port 116 of collar 108 can pass into an interior of the manifold body via hole(s) 120, from the interior of the manifold body to an inlet of the nozzle, and from the inlet of the nozzle to the outlet of the nozzle. For example, manifold body 104 may be configured to hold a portion of the nozzle that includes the inlet of the nozzle, such that the inlet of the nozzle is disposed in (or otherwise in fluid communication with) the interior of the manifold body.

To facilitate passage of sealant from inlet port 116 through hole(s) 120 and into an interior of manifold body 104, a space may be defined between collar 108 and manifold 104. For example, manifold body 104 and/or collar 108 may be configured (e.g., dimensioned and/or shaped) such that a space for sealant flow exists between the collar and hole(s) 120. The space facilitates sealant flow. Particularly in examples in which an inner wall of the collar engages an exterior wall of the manifold body, it may be difficult for sealant to flow unless such a space is provided. For example, without such a space, inlet port 116 may be blocked by the exterior wall of the manifold body. Accordingly, in some examples hole(s) 120 are disposed in a groove, recess, indentation, and/or other suitable feature of manifold body 104, such that the hole(s) are spaced from an inner wall of the collar.

For instance, in some examples, an exterior of manifold body 104 has a groove 124. For example, manifold body 104 may have a generally cylindrical shape with groove 124 extending around at least a portion of a circumference of the cylinder. Groove 124 may have a rounded profile (for example, a profile having a semicircular shape). A rounded profile may facilitate sealant flow (e.g., because it has few or no sharp corners or edges where sealant could build up). However, in general, groove 124 may have any suitable shape.

Manifold body 104 may have any suitable number of holes 120 (also referred to as orifices, apertures, openings, and/or other suitable term), e.g., in a wall of the manifold body. Holes 120 may have any suitable size(s) or shape(s). In examples in which manifold body 104 has more than one hole 120, the holes may be distributed in any suitable manner (e.g., equidistant from each other or not equidistant from each other) and the holes do not necessarily all have the same size and/or shape. In some examples, manifold body 104 has three or more holes 120. In some examples, manifold body 104 has six or more holes 120. For example, manifold body 104 may have six holes 120 disposed in circumferential groove 124 extending about an entirety of a circumference of the manifold body; this arrangement may facilitate passage of sealant from inlet port 116 into the interior of the manifold body irrespective of the extent to which collar 108 and the manifold body have rotated relative to one another. In some cases, a different arrangement of holes could allow a disadvantageous situation to arise where the manifold body and/or the collar have rotated relative to one another such that the hole(s) are far from the inlet port of the collar and thus cannot effectively provide fluid communication between the inlet port and the nozzle. In general, however, any configuration of holes (e.g., any size, shape, and/or distribution of holes) suitable for providing fluid communication for the sealant (considering, e.g., viscosity and/or other suitable properties of the sealant) may be used.

In some examples, manifold body 104 comprises a projection 132 (also called a protrusion, extension, and/or other suitable term) extending from a second end of the manifold body, and the projection is configured to be received in a tool holder. For instance, projection 132 may be threaded so that it can be threadedly received in a threaded tool holder. Alternatively, or additionally, projection 132 may be dimensioned to be clamped by a tool holder such that the tool holder holds the projection. In general, the projection may be configured to be held by and/or received in any suitable tool holder in any suitable manner.

In examples in which manifold body 104 includes projection 132 (and/or another suitable device configured to facilitate mounting the manifold body in a tool holder or other suitable device), dauber assembly 100 may be referred to as an adapter. That is, the dauber assembly may be referred to as an adapter configured to facilitate attachment of a nozzle (which may be a third-party product, or a product manufactured on-demand at a manufacturing facility, or any other suitable product provided in any suitable way) to a machine that will use the dauber assembly to automatically apply sealant to a hole in which a fastener is to be installed (e.g., a hole 144 of an illustrative workpiece 148 depicted in FIG. 1).

In FIG. 1, the tool holder is schematically represented as tool holder 136. In some examples, tool holder 136 may be a tool holder of a Gemcor machine designed to hold a microshaver and/or cutter for rivets.

Projection 132 may be rigidly coupled to manifold body 104, formed integrally with the manifold body, and/or otherwise configured such that the manifold body and the projection are configured to rotate together relative to collar 108.

In some examples, manifold body 104 comprises a flange 140 extending radially from the body adjacent projection 132. Collar 108 is dimensioned such that any contact between the collar and the underside of flange 140 and/or a lip 128 of the nozzle permits (e.g., does not impede) relative rotation between the collar and the manifold body. For example, collar 108 may be dimensioned such that the top of the collar is spaced from flange 140 and/or lip 128, or the collar may be dimensioned such that the top of the collar only loosely contacts the flange and/or lip.

In some examples, the first end of manifold body 104 is configured to receive the nozzle such that the nozzle is coaxial with a longitudinal axis defined by projection 132. In this arrangement, the nozzle is disposed coaxially with a tool holder holding the projection (e.g., as opposed to being laterally displaced off to the side relative to the tool holder). In some examples, inlet port 116 is oriented transverse to the longitudinal axis defined by the nozzle and projection 132; in other examples, however, the inlet port may have any suitable orientation relative to the nozzle and/or projection 132.

Dauber assembly 100 may be sold as a product including manifold body 104 and collar 108 assembled together (e.g., with the collar extending at least partially around the manifold body) and/or as a kit including the manifold body and collar in a disassembled state (e.g., with the collar not disposed around the manifold body, with the user of the kit assembling the collar and body to use the assembly). In either case, one or more nozzles may be provided in addition to the manifold body and collar, or may be omitted (e.g., with the idea that the user will provide the nozzle separately;

the nozzle may be a third-party product and/or a nozzle originally designed for use with a different device, such as a manual sealant gun). If a nozzle is included in the kit or product, it may be preinstalled in the manifold body or may be provided as a separate component not coupled to the manifold body.

In some examples, one or more dimensions of the manifold body (e.g., a length, width, height, diameter, etc.) are configured to make the manifold body small enough to facilitate clearance with respect to other equipment (e.g., sealant tubing and/or components of a fastener installation machine), reduce the amount of sealant present in the system, and/or facilitate a rapid delivery of sealant (e.g., because if the volume of the manifold body is small, less time is required for the first sealant input into the dauber assembly to pass from the inlet port to the nozzle). However, in general, the manifold body and other components of the dauber assembly may have any suitable dimensions.

Figure 2:
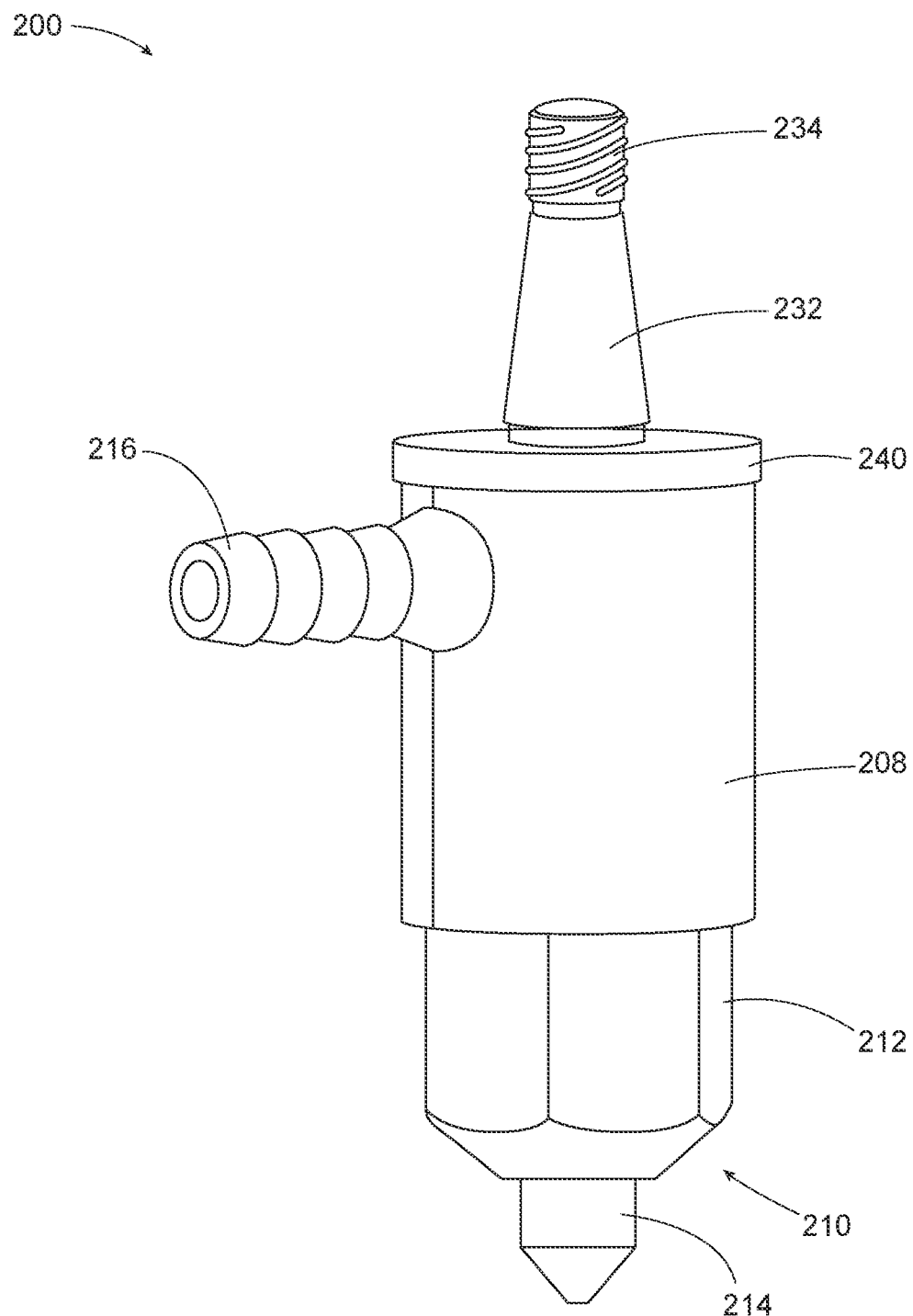
FIG. 2 is an isometric view of another illustrative dauber assembly in accordance with aspects of the present disclosure.
Figure 3:
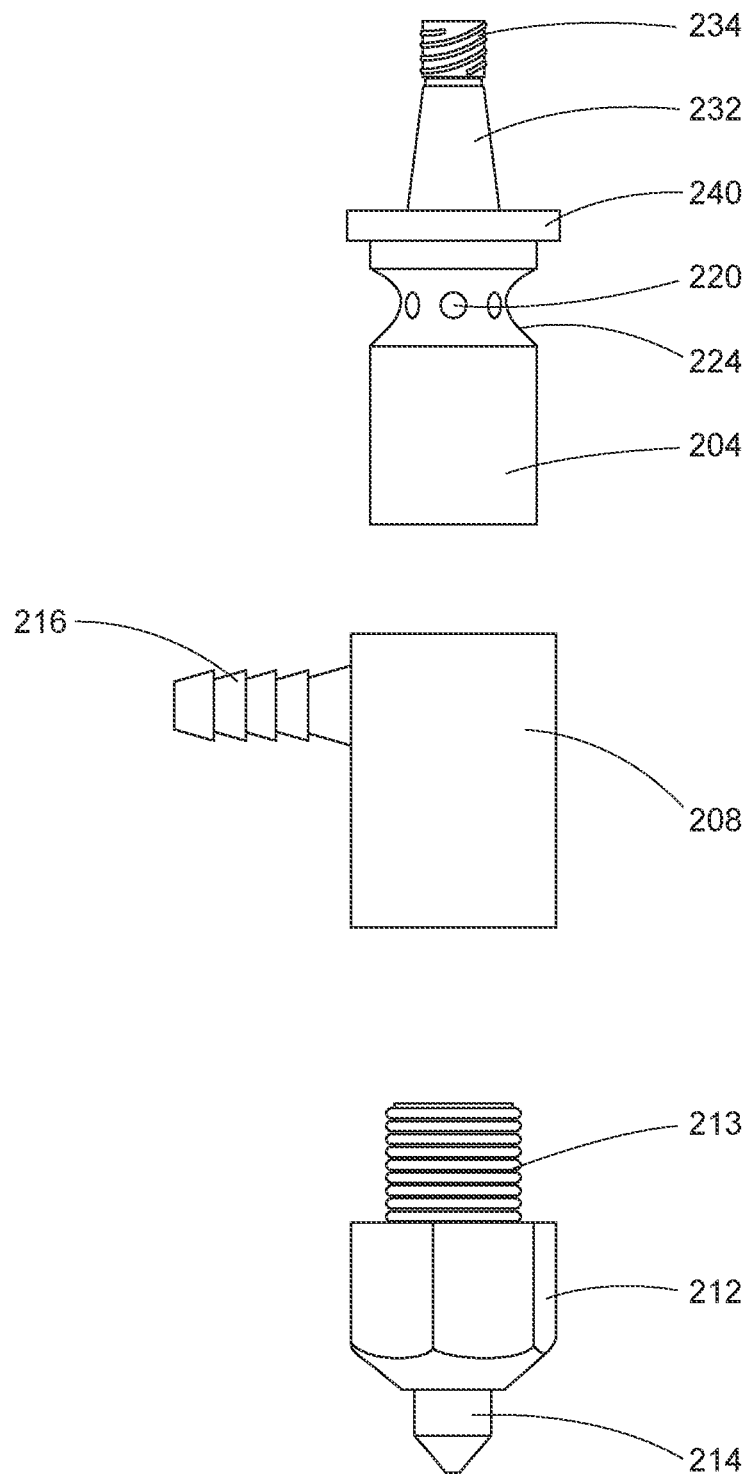
FIG. 3 is an exploded front view of the dauber assembly of FIG. 2.
Figure 4:
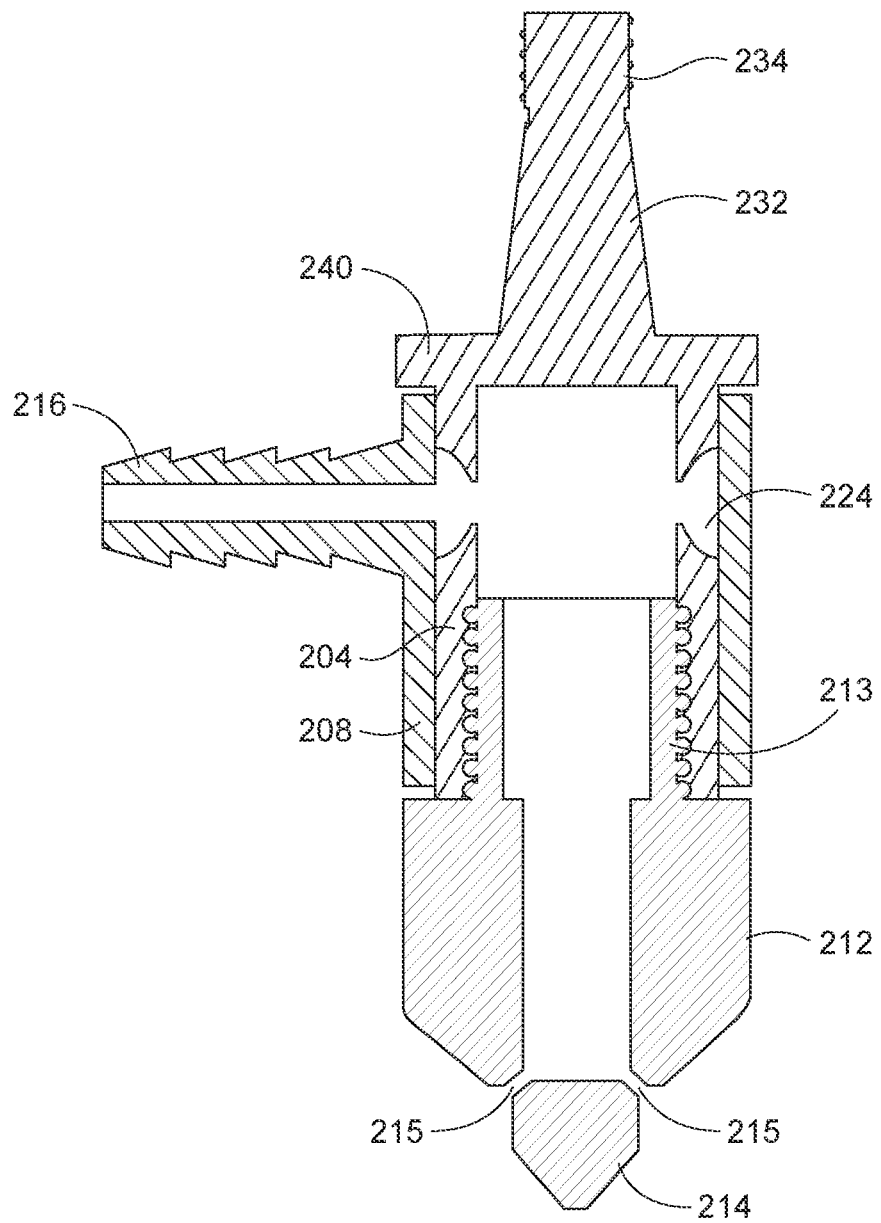
FIG. 4 is a sectional view of the dauber assembly of FIG. 2.
Figure 5:
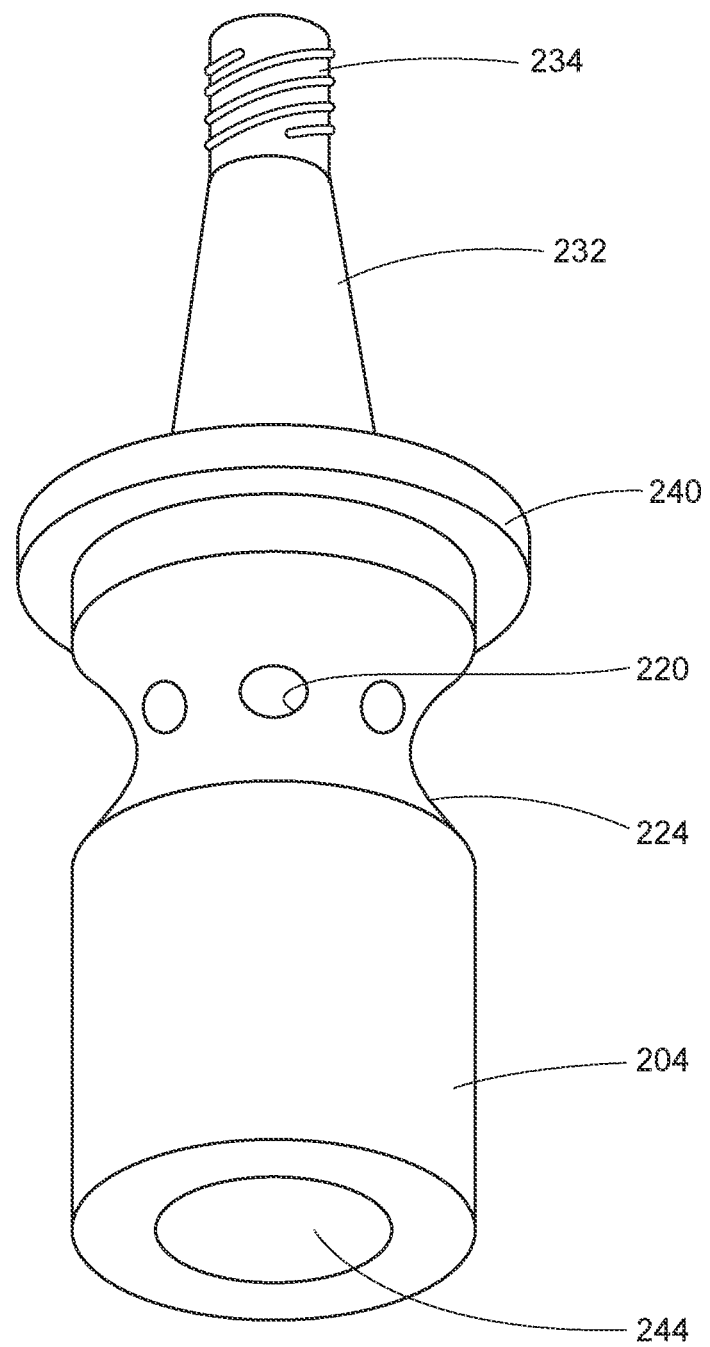
FIG. 5 is an isometric bottom view of a manifold body of the dauber assembly of FIG. 2.
Figure 6:
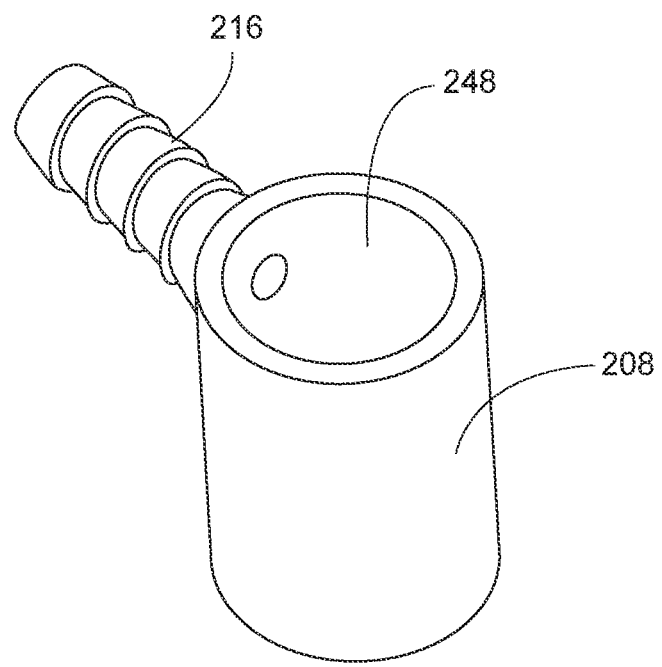
FIG. 6 is an isometric top view of a collar of the dauber assembly of FIG. 2.
Figure 7:
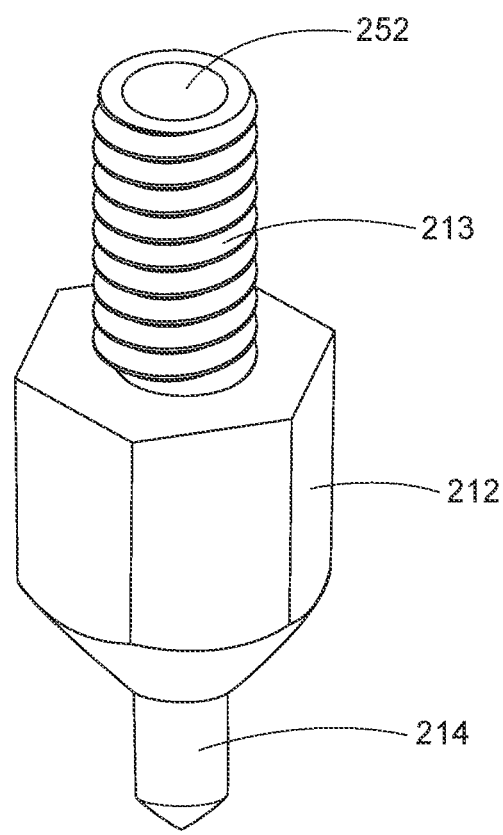
FIG. 7 is an isometric top view of a dauber nozzle of the dauber assembly of FIG. 2.

FIGS. 2-10 depict an illustrative dauber assembly 200, which is an example of dauber assembly 100 depicted schematically in FIG. 1. FIG. 2 is an isometric view depicting dauber assembly 200 in an assembled state, FIG. 3 is an exploded front view depicting components of the dauber assembly, and FIG. 4 is a sectional front view depicting the dauber assembly in the assembled state. FIGS. 5-7 are isometric views of portions of dauber assembly 200, as described below.

Dauber assembly 200 comprises a manifold body 204 and a collar 208 configured to extend around the manifold body. Put another way, manifold body 204 is configured to be disposed within collar 208 concentrically with the collar. Manifold body 204 and collar 208 each have generally cylindrical shapes.

Manifold body 204 is configured to receive a nozzle, such as the depicted example nozzle 210. In the depicted example, nozzle 210 has a body 212, a tip 214, and a threaded portion 213 that is received in a threaded lower portion of manifold body 204. However, manifold body 204 may receive any suitable nozzle.

Collar 208 includes a barbed nipple 216 extending from the collar. Nipple 216 is configured to couple to a tube coupled (directly or indirectly) to a sealant source. Manifold body 204 has a plurality of openings 220 configured to provide fluid communication between nipple 216 and an interior of the manifold body, such that sealant can pass from the nipple through one or more of the openings into the manifold body. An exterior of manifold body 204 has a rounded groove 224 extending circumferentially around the body, which provides space for sealant to move (e.g., even if none of the openings are exactly aligned with the nipple). Other than groove 224, the exterior of manifold body 204 engages an interior wall 248 of collar 208 (see FIG. 6, an isometric top view of the collar).

A protrusion 232 extends from an upper end of the manifold body. Protrusion 232 has a threaded tip 234 configured to be received in a tool holder. In other examples, the protrusion may be configured to be received in a tool holder in another manner (e.g., in unthreaded engagement). A flange 240 extends radially from manifold body 204 adjacent protrusion 232. Collar 208 is dimensioned such that flange 240 is spaced from an upper edge of collar 208 during normal operation to permit the collar and manifold body to swivel relative to one another. However, if collar 208 is displaced vertically upward during use, flange 240 may help to prevent the collar from slipping up past manifold body 204 (or to prevent the manifold body from slipping down through the collar).

Similarly, during normal operation, a lower edge of collar 208 is spaced from an upper surface of nozzle body 212 (see, e.g., FIG. 4), such that the collar and nozzle can rotate relative to one another. However, if collar 208 is displaced vertically downward during use, nozzle body 212 may help to prevent the collar from slipping down past manifold body 204 (or to prevent the manifold body from slipping up through the collar). In the depicted example, a bottom edge of manifold body 204 engages the upper surface of the nozzle body.

FIG. 5 is an isometric bottom view of manifold body 204. As shown in FIG. 5, manifold body 204 has an outlet 244 configured to receive a portion of a nozzle (e.g., threaded portion 213 of nozzle 210). As shown in FIG. 7, an isometric top view of nozzle 210, nozzle portion 213 has a nozzle inlet 252 configured to receive sealant to be dispensed from the nozzle. Accordingly, sealant passes from nipple 216 through openings 220 into a hollow interior of the manifold body and into nozzle inlet 252. From the nozzle, the sealant is dispensed through nozzle openings 215 (see, e.g., FIG. 4).

Figure 8:
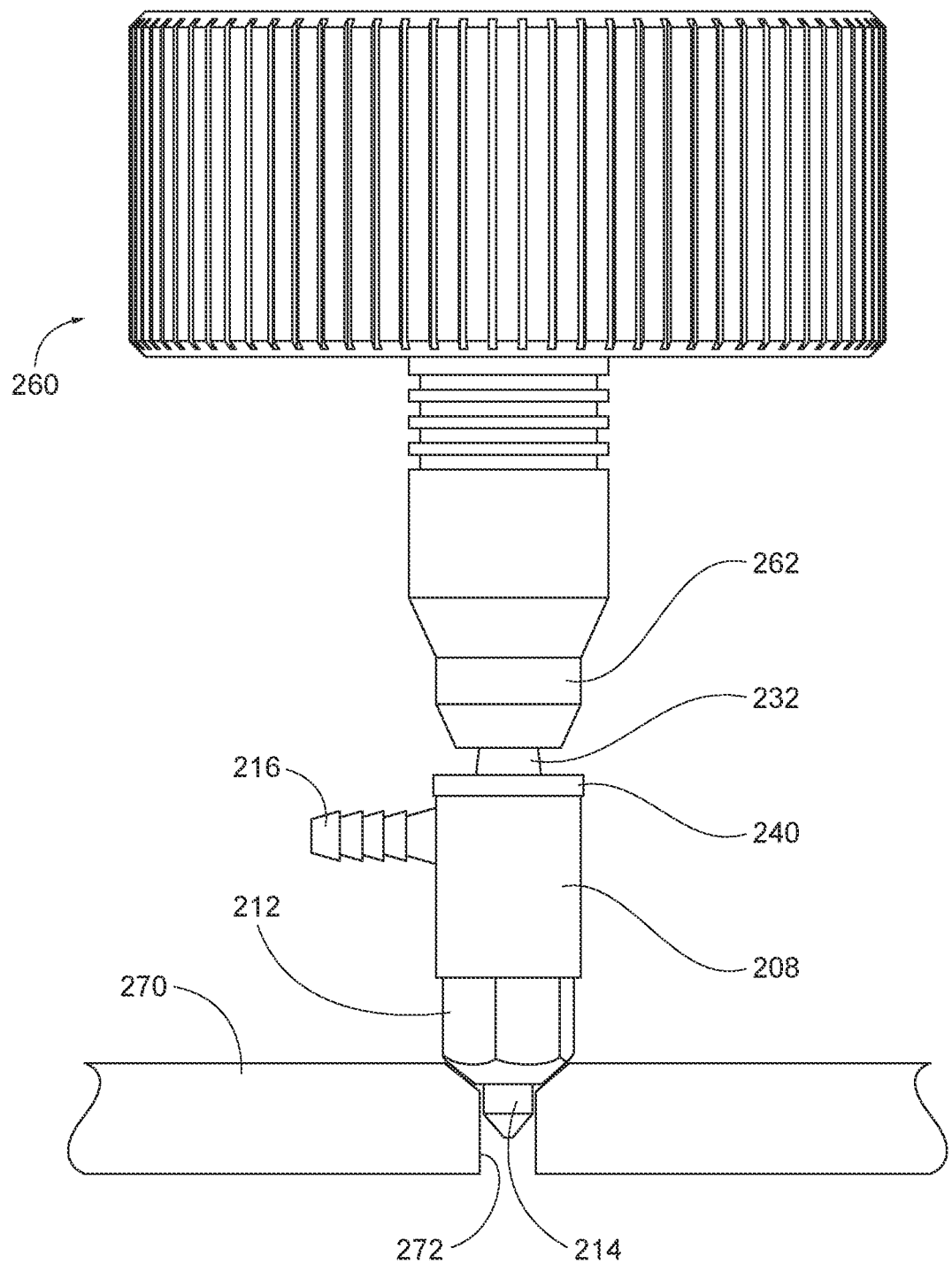
FIG. 8 is a front view of the dauber assembly of FIG. 2 mounted in an illustrative fastening machine in accordance with aspects of the present disclosure.

FIG. 8 is a side view depicting dauber assembly 200 mounted in a machine 260, which may be a microshaver or cutter of a Gemcor fastening machine. Machine 260 has a spindle 262 in which protrusion 232 and protrusion tip 234 are received. The nozzle held by manifold body 204 is positioned to dispense sealant for wet installation of a fastener (not shown) in a workpiece 270 (e.g., to dispense sealant onto the countersink portion of a hole 272 in the workpiece). Machine 260 may be configured to rotate manifold body 204 (and thus the nozzle) after or while dispensing sealant so that nozzle body 212 spreads sealant across the countersink. This helps to make sure the hole is adequately sealed after the fastener is installed. Because collar 208 and manifold body 204 are configured to rotate relative to one another, rotating the manifold body does not cause the collar to rotate. Accordingly, rotating the manifold body does not disturb the sealant source (not shown) to which nipple 216 is coupled.

Figure 9:
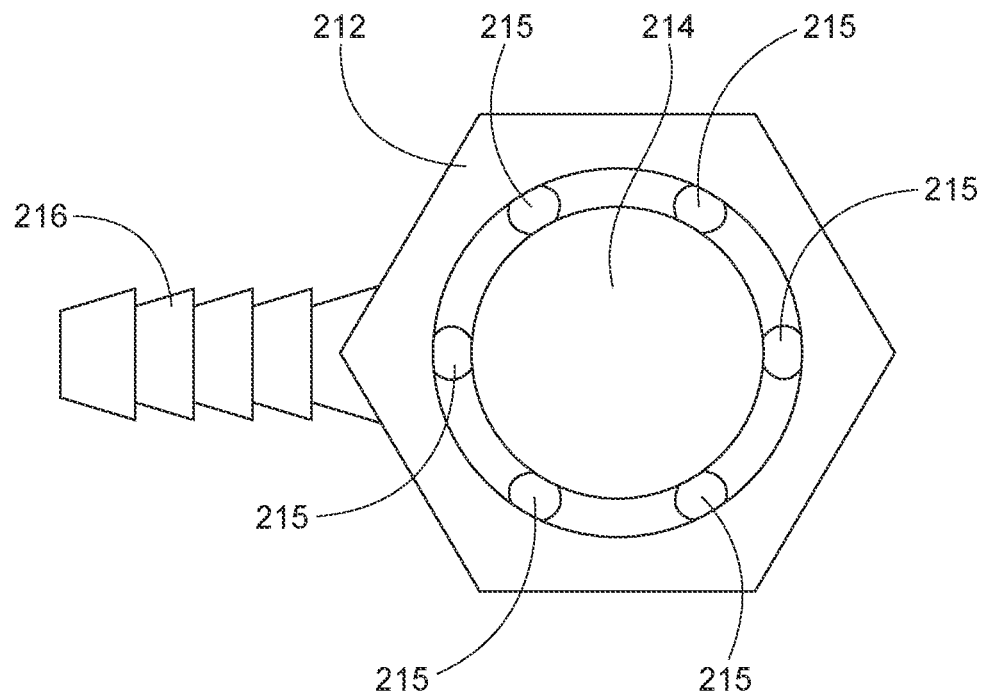
FIG. 9 is a bottom view of the dauber assembly of FIG. 2 in accordance with aspects of the present disclosure.
Figure 10:
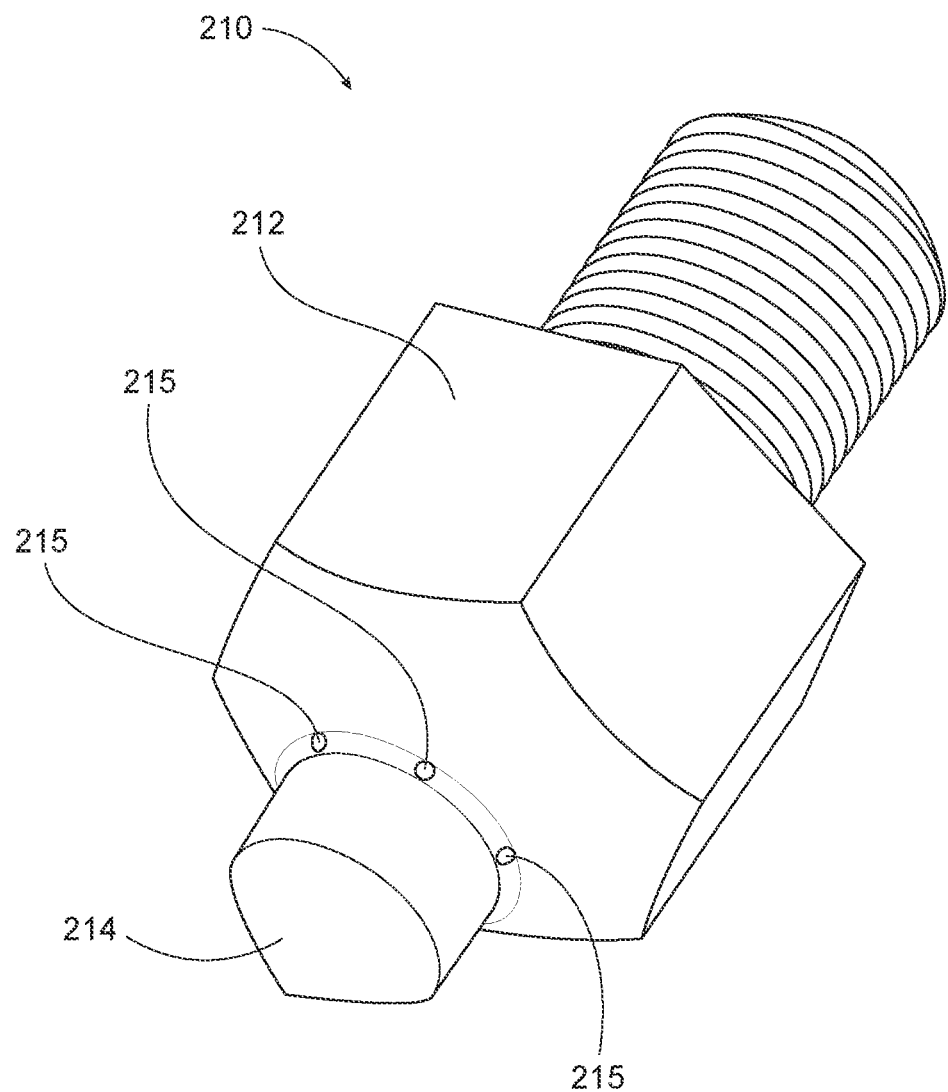
FIG. 10 is an isometric bottom view of the dauber nozzle of FIG. 7.

FIG. 9 is a bottom view of dauber assembly 200 and FIG. 10 is a bottom isometric view of nozzle 210. As FIGS. 9-10 show, openings 215 are defined between nozzle body 212 and nozzle tip 214 of nozzle 210. Openings 215 permit sealant to exit nozzle 210 and be deposited on a workpiece, such as workpiece 270 of FIG. 8. In the depicted example, nozzle 210 includes six openings 215, which may help to facilitate a relatively uniform distribution of sealant dispensed from the nozzle onto a workpiece (e.g., a countersink portion of a hole in which a fastener is to be installed, such that when the fastener is installed, the sealant is uniformly distributed about the fastener). However, in other examples, the nozzle can include any other suitable number of openings and, more generally, any structure(s) suitable for dispensing sealant.

Figure 11:
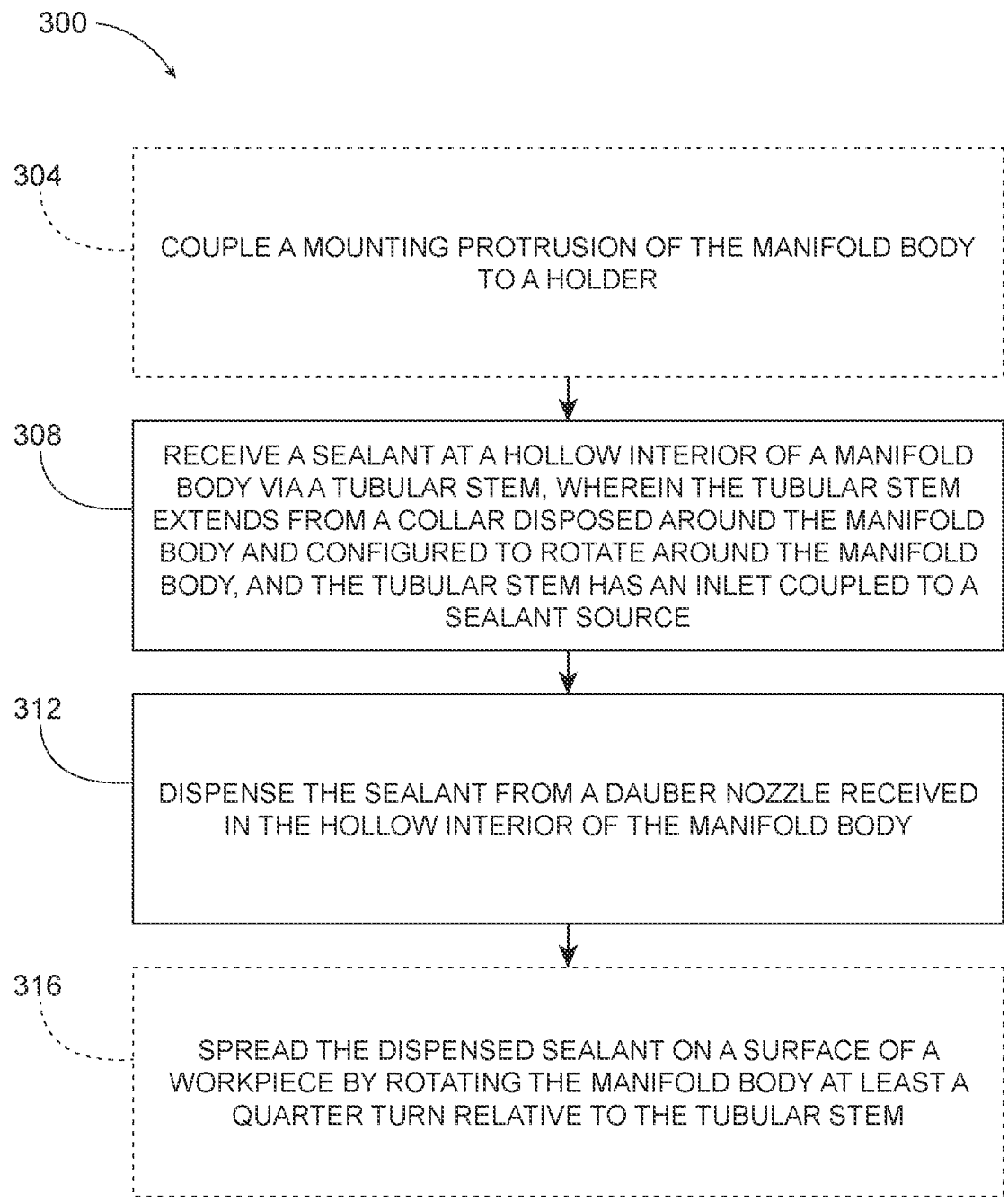
FIG. 11 is a flow chart depicting steps of an illustrative method for applying sealant in accordance with aspects of the present disclosure.

FIG. 11 is a flowchart illustrating steps performed in an illustrative method 300 for applying sealant. In some examples, method 300 includes (or is part of another method that includes) additional method steps not depicted in FIG. 11. Although various steps of method 300 are described below and depicted in FIG. 11, the steps need not necessarily all be performed, and in some cases may be performed simultaneously or in a different order than the order shown. Aspects of dauber assemblies 100 and 200 may be utilized in the method steps described below. Where appropriate, reference may be made to components and systems that may be used in carrying out each step. These references are for illustration, and are not intended to limit the possible ways of carrying out any particular step of the method.

At step 304, method 300 optionally includes coupling a mounting protrusion of a manifold body to a holder (e.g., a tool holder of a machine, such as a machine that is part of a fastener installing system; a holder of an end effector of a robotic arm; and/or any other suitable holder).

At step 308, method 300 includes receiving a sealant at a hollow interior of the manifold body via a tubular stem or other suitable inlet port. The tubular stem, which may comprise a barbed nipple, extends from a collar disposed around the manifold body. The tubular stem has an inlet coupled to a sealant source.

In some examples, the collar is disposed around an entirety of a circumference of the manifold body. The collar is configured to rotate around the manifold body.

In some examples, the mounting protrusion and the dauber nozzle are disposed along a same first axis, and the tubular stem is oriented along a second axis transverse to the first axis.

At step 312, method 300 includes dispensing the sealant from a dauber nozzle received in the hollow interior of the manifold body.

At step 316, method 300 optionally includes spreading the dispensed sealant on a surface of a workpiece (e.g., a countersink portion of a fastener hole in the workpiece) by rotating the manifold body relative to the tubular stem. In some examples, the manifold body is rotated by a quarter turn relative to the tubular stem, or by between a quarter and a half relative to the tubular stem, or by more than a half turn relative to the tubular stem. In general the body may be rotated relative to the stem by any suitable amount to spread the dispensed sealant to obtain a desired coverage of the sealant on the workpiece surface.

Illustrative, non-exclusive aspects and features of dauber assemblies and related methods are presented without limitation below as a series of paragraphs alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations. Some of the paragraphs below include reference numerals used elsewhere in the present disclosure to refer to particular example elements and/or method steps; these reference numerals are included below as illustrative nonlimiting examples of subject matter described by the paragraph in question.

A1. A dauber assembly comprising:
  a manifold body comprising a first end configured to receive a nozzle; and
  a collar extending at least partially around the manifold body, the collar comprising an inlet port;
  wherein the manifold body has one or more holes providing fluid communication between the inlet port of the collar and an outlet of the nozzle when the nozzle is received by the first end of the manifold body.

A2. The dauber assembly of paragraph A1, wherein the collar is disposed rotatably about the manifold body.

A3. The dauber assembly of paragraph A2, wherein the collar is configured to rotate at least 360 degrees about the manifold body.

A4. The dauber assembly of any one of paragraphs A1-A3, wherein the manifold body comprises a hollow cylinder configured to receive the nozzle at an interior of the first end of the manifold body, wherein an exterior of the hollow cylinder has a circumferential groove, and wherein the one or more holes are disposed in the circumferential groove.

A4.1 The dauber assembly of paragraph A4, wherein the hollow cylinder is configured to threadedly receive the nozzle.

A5. The dauber assembly of any one of paragraphs A1-A4.1, wherein the one or more holes include at least three holes.

A6. The dauber assembly of any one of paragraphs A1-A5, wherein the one or more holes include at least six holes.

A7. The dauber assembly of any one of paragraphs A1-A6, wherein the manifold body comprises a projection extending from a second end of the manifold body, and the projection is configured to be received in a tool holder.

A8. The dauber assembly of paragraph A7, wherein the first end of the manifold body is configured to receive the nozzle such that the nozzle is coaxial with a longitudinal axis defined by the projection, and the inlet port is oriented transverse to the longitudinal axis.

A9. The dauber assembly of any one of paragraphs A1-A8, further comprising the nozzle.

A10. The use of the dauber assembly of any one of paragraphs A1-A9 to apply sealant.

B1. An adapter for a dauber nozzle, the adapter comprising:
 a body comprising a wall defining a hollow interior, the body having an outlet configured to receive an inlet portion of the dauber nozzle;
 a protrusion extending from the body and configured to be received in a holder; and
 a collar extending around at least a portion of a circumference of the body, the collar including an inlet stem;
 wherein the wall of the body has a plurality of openings and the inlet stem of the collar is in fluid communication with the outlet of the body via the plurality of openings and the hollow interior of the body.

B2. The adapter of paragraph B1, wherein the collar and the body are configured to rotate relative to each other.

B3. The adapter of paragraph B2, wherein the collar and the body are configured to rotate relative to each other by at least 360 degrees.

B4. The adapter of any one of paragraphs B1-B3, wherein the protrusion is rigidly coupled to the body such that the protrusion and the body are configured to rotate together relative to the collar.

B5. The adapter of any one of paragraphs B1-B3, wherein the protrusion is integral with the body.

B6. The adapter of any one of paragraphs B1-B5, wherein the wall of the body comprises a cylinder having a circumferential groove and the plurality of openings are disposed in the circumferential groove.

B7. The adapter of paragraph B6, wherein the circumferential groove has a rounded profile.

B8. The adapter of any one of paragraphs B1-B7, wherein the body comprises a flange extending radially from the body adjacent the protrusion, and the collar is dimensioned such that, during normal operation, a first end of the collar is spaced from the flange and a second end of the collar is spaced from a lip of the dauber nozzle when the inlet portion of the dauber nozzle is received by the outlet of the body.

B9. The use of the adapter of any one of paragraphs B1-B8 to apply sealant.

C1. A method for applying sealant, the method comprising:
 receiving a sealant at a hollow interior of a manifold body via a tubular stem, wherein the tubular stem extends from a collar disposed around the manifold body and configured to rotate around the manifold body, and the tubular stem has an inlet coupled to a sealant source; and
 dispensing the sealant from a dauber nozzle received in the hollow interior of the manifold body.

C2. The method of paragraph C1, wherein the collar is disposed around an entirety of a circumference of the manifold body.

C3. The method of any one of paragraphs C1-C2, further comprising spreading the dispensed sealant on a surface of a workpiece by rotating the manifold body at least a quarter turn relative to the tubular stem.

C4. The method of any one of paragraphs C1-C3, further comprising coupling a mounting protrusion of the manifold body to a holder.

C5. The method of paragraph C4, wherein the mounting protrusion and the dauber nozzle are disposed along a same first axis.

C6. The method of paragraph C5, wherein the tubular stem is oriented along a second axis transverse to the first axis.

C7. The method of any one of paragraphs C4-C6, wherein the holder is a holder of an end effector of a robotic arm.

C8. The method of any one of paragraphs C4-C6, wherein the holder is a tool holder.

D1. A kit comprising:
 a manifold body comprising a first end configured to receive a nozzle; and
 a collar configured to extend at least partially around the manifold body, the collar comprising an inlet port;
 wherein the manifold body has one or more holes configured to provide fluid communication between the inlet port of the collar and an outlet of the nozzle when the nozzle is received by the first end of the manifold body and the collar extends at least partially around the manifold body.

D2. The kit of paragraph D1, wherein the collar is configured to rotate around the manifold body when the collar extends at least partially around the manifold body.

D3. The kit of paragraph D2, wherein the collar is configured to rotate at least 360 degrees around the manifold body when the collar extends at least partially around the manifold body.

D4. The kit of any one of paragraphs D1-D3, wherein the manifold body comprises a hollow cylinder configured to threadedly receive the nozzle at an interior of the first end of the manifold body, wherein an exterior of the hollow cylinder has a circumferential groove, and wherein the one or more holes are disposed in the circumferential groove.

D5. The kit of any one of paragraphs D1-D4, wherein the one or more holes include at least three holes.

D6. The kit of any one of paragraphs D1-D5, wherein the one or more holes include at least six holes.

D7. The kit of any one of paragraphs D1-D6, wherein the manifold body comprises a projection extending from a second end of the manifold body, and the projection is configured to be received in a tool holder.

D8. The kit of paragraph D7, wherein the first end of the manifold body is configured to receive the nozzle such that the nozzle is coaxial with a longitudinal axis defined by the projection, and the collar is configured to extend at least partially around the manifold body such that the inlet port of the collar is oriented transverse to the longitudinal axis.

D9. The kit of any one of paragraphs D1-D8, further comprising the nozzle.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A dauber assembly comprising:
a manifold body comprising a first end configured to receive a nozzle; and
a collar extending at least partially around the manifold body, the collar comprising an inlet port;
wherein the manifold body comprises a wall having one or more holes formed in a circumferential portion of the wall, the one or more holes providing fluid communication between the inlet port of the collar and an outlet of the nozzle when the nozzle is received by the first end of the manifold body; and
wherein the manifold body comprises a projection extending from a second end of the manifold body, the projection is configured to be received in a tool holder, and the projection is nondetachably integral with the manifold body.

2. The dauber assembly of claim 1, wherein the collar is disposed rotatably about the manifold body.

3. The dauber assembly of claim 2, wherein the collar is configured to rotate at least 360 degrees about the manifold body.

4. The dauber assembly of claim 1, wherein the manifold body comprises a hollow cylinder configured to receive the nozzle at an interior of the first end of the manifold body, wherein an exterior of the hollow cylinder has a circumferential groove, and wherein the one or more holes are disposed in the circumferential groove.

5. The dauber assembly of claim 4, wherein the hollow cylinder is configured to threadedly receive the nozzle.

6. The dauber assembly of claim 1, wherein the one or more holes include at least three holes.

7. The dauber assembly of claim 1, wherein the first end of the manifold body is configured to receive the nozzle such that the nozzle is coaxial with a longitudinal axis defined by the projection, and the inlet port is oriented transverse to the longitudinal axis.

8. The dauber assembly of claim 1, wherein the manifold body further comprises a flange extending radially from the manifold body between the collar and the projection, such that the flange is configured to inhibit motion of the collar toward the projection.

9. An adapter for a dauber nozzle, the adapter comprising:
a body comprising a wall defining a hollow interior, the body having an outlet configured to receive an inlet portion of the dauber nozzle;
a protrusion extending from the body and configured to be received in a holder, wherein the protrusion is formed as a single piece with the body; and
a collar extending around at least a portion of a circumference of the body, the collar including an inlet stem;
wherein the wall of the body has a plurality of openings formed in a circumferential portion of the wall of the body, and the inlet stem of the collar is in fluid communication with the outlet of the body via the plurality of openings and the hollow interior of the body.

10. The adapter of claim 9, wherein the collar and the body are configured to rotate relative to each other.

11. The adapter of claim 9, wherein the wall of the body comprises a cylinder having a circumferential groove and the plurality of openings are disposed in the circumferential groove.

12. The adapter of claim 11, wherein the circumferential groove has a rounded cross-sectional profile.

13. The adapter of claim 9, wherein the inlet stem comprises a barbed nipple.

14. The adapter of claim 9, further comprising a flange extending radially from the body between the collar and the protrusion, such that the flange is configured to inhibit motion of the collar toward the protrusion.

15. A method for applying sealant, the method comprising:
coupling a mounting protrusion of a manifold body to a holder, wherein the mounting protrusion is formed as a single integral piece with the manifold body;
receiving a sealant at a hollow interior of the manifold body via a tubular stem, wherein the hollow interior of the manifold body is defined by at least one wall of the manifold body and the at least one wall has an opening formed in a circumferential portion of the wall and configured to provide fluid communication between the hollow interior and the tubular stem, wherein the tubular stem extends from a collar disposed around the manifold body and configured to rotate around the manifold body, and the tubular stem has an inlet coupled to a sealant source; and
dispensing the sealant from a dauber nozzle received in the hollow interior of the manifold body.

16. The method of claim 15, wherein the collar is disposed around an entirety of a circumference of the manifold body.

17. The method of claim 15, further comprising spreading the dispensed sealant on a surface of a workpiece by rotating the manifold body at least a quarter turn relative to the tubular stem.

18. The method of claim 15, wherein the holder is a holder of an end effector of a robotic arm.

19. The method of claim 15, wherein the holder is a tool holder.

* * * * *